United States Patent
Rolland

[11] 3,901,378
[45] Aug. 26, 1975

[54] ROLLER CONVEYOR FOR ASYMMETRICAL MEMBERS

[75] Inventor: Burton A. Rolland, Rockford, Ill.

[73] Assignee: W. A. Whitney Corporation, Rockford, Ill.

[22] Filed: Apr. 9, 1973

[21] Appl. No.: 349,013

[52] U.S. Cl. ........................ 198/127 R; 193/35 SS
[51] Int. Cl. ............................................. B65g 13/02
[58] Field of Search ............ 193/35 SS, 35 A, 35 B; 226/188, 189; 72/251; 198/127 R

[56] References Cited
UNITED STATES PATENTS
1,865,890  7/1932  Drake ........................... 198/127 R
2,234,162  3/1941  Anderson ...................... 198/127 R Primary Examiner—James B. Marbert
Assistant Examiner—Douglas D. Watts
Attorney, Agent, or Firm—Wolfe, Hubbard, Leydig, Voit & Osann, Ltd.

[57] ABSTRACT

The conveyor includes several standard rollers and several elevating rollers, the latter being mounted for shifting between raised and lowered positions relative to the standard rollers. An elongated asymmetrical member such as a rail is loaded broadwise onto the conveyor while the elevating rollers are in their lowered positions. The elevating rollers then are raised and serve to shift the member from a cocked position to a squared-up position prior to the member being advanced endwise by the rollers.

2 Claims, 9 Drawing Figures

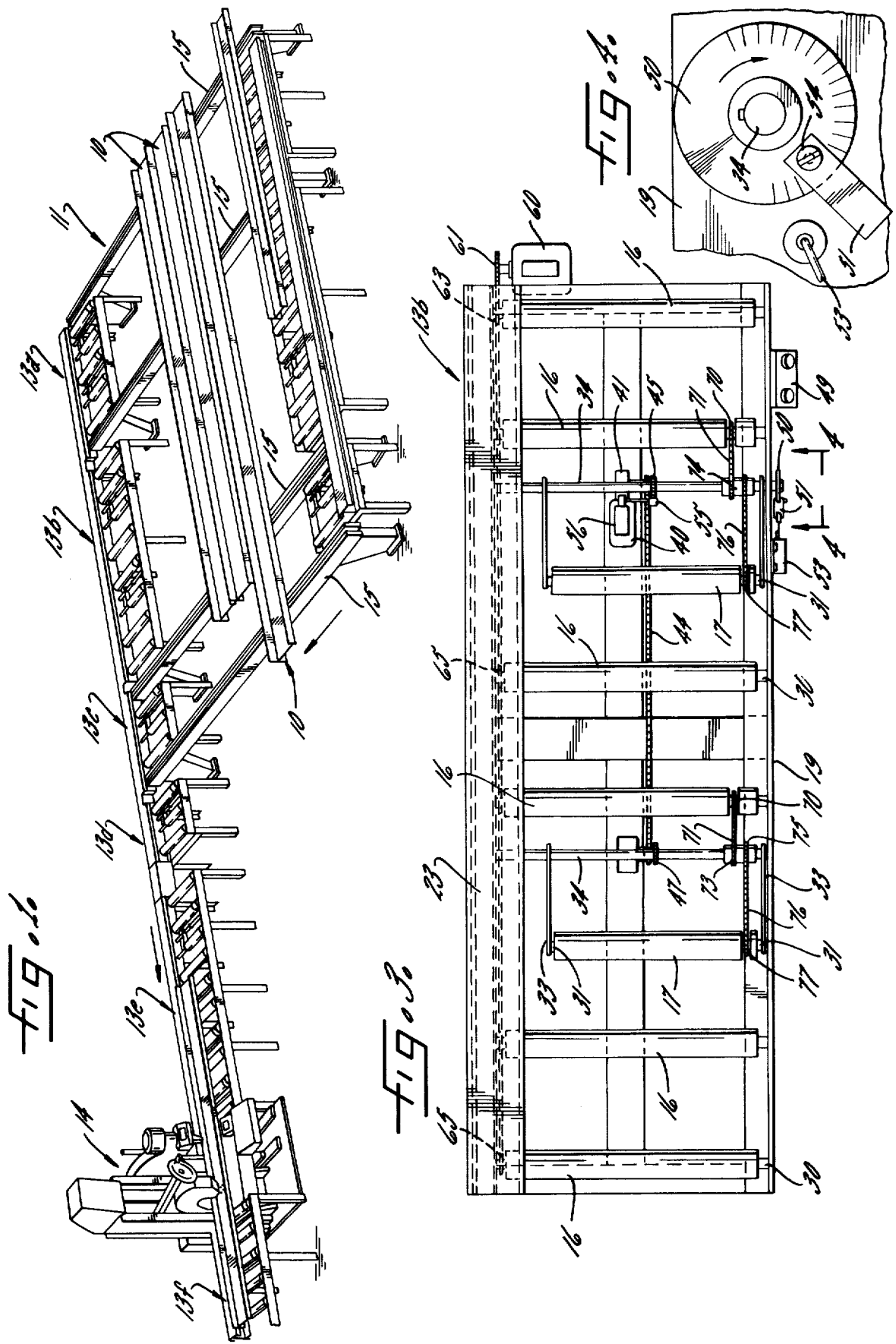

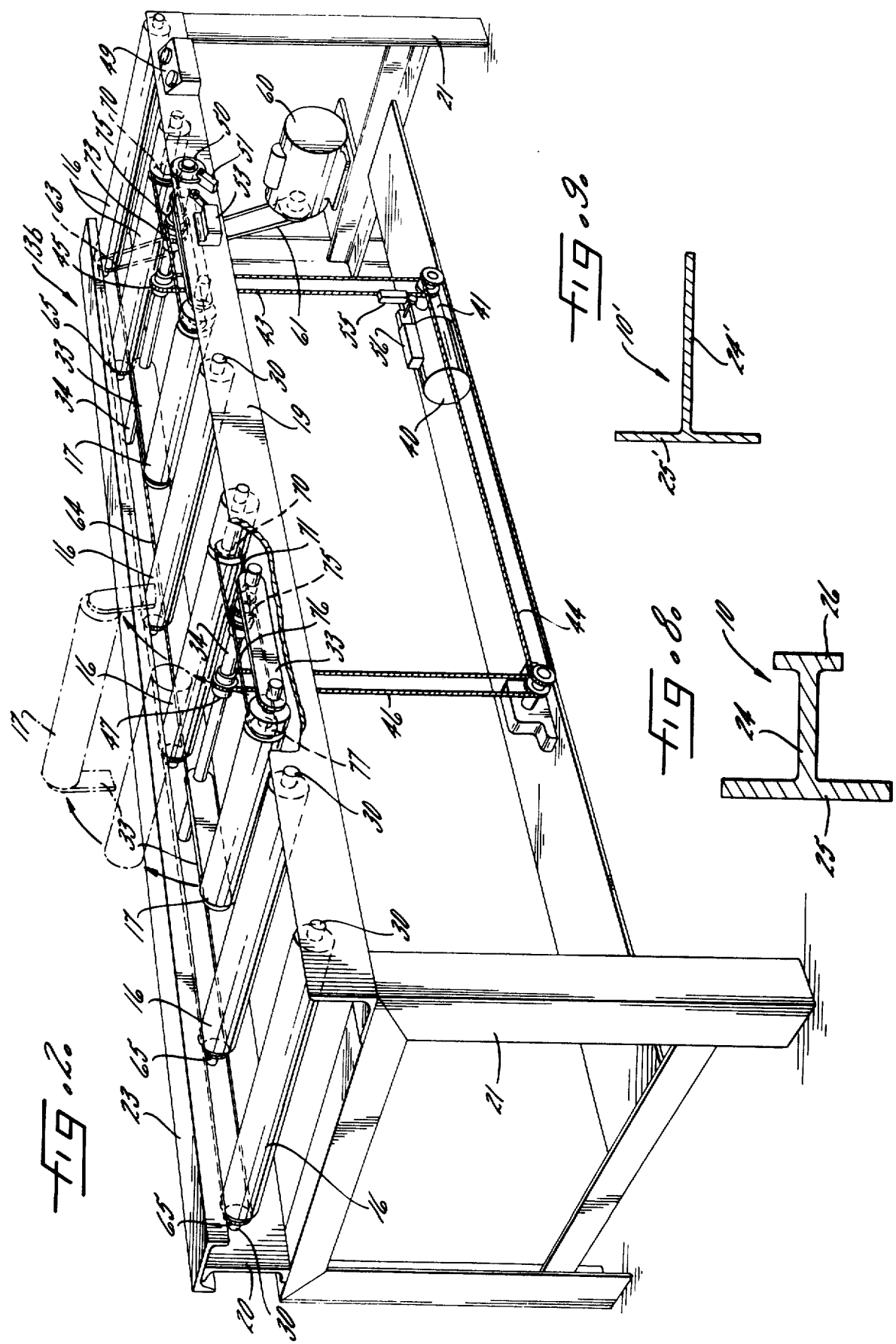

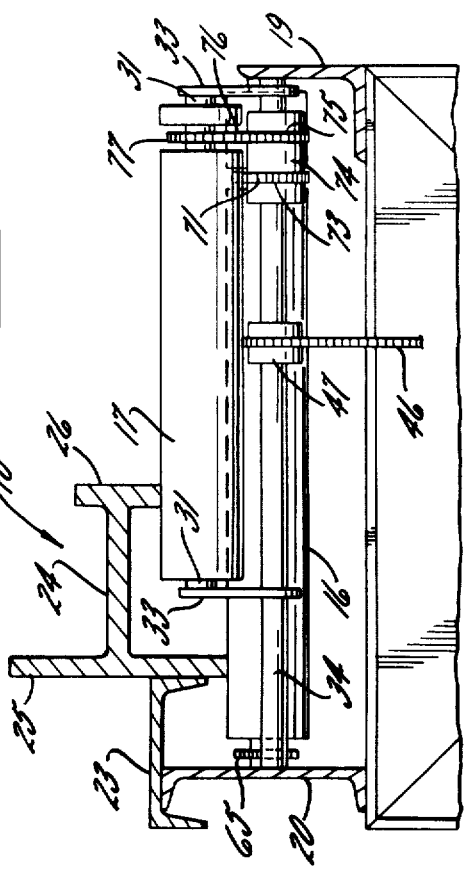
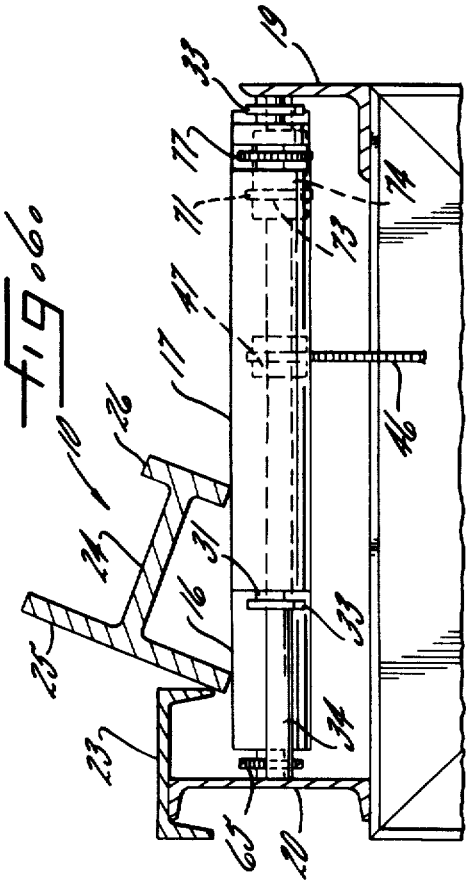

ROLLER CONVEYOR FOR ASYMMETRICAL MEMBERS

BACKGROUND OF THE INVENTION

This invention relates to a roller conveyor of the type used for advancing an elongated member in a lengthwise direction to a station where an operation such as punching is performed on the member. Such a conveyor conventionally includes several horizontally spaced rollers which rotate about horizontal axes as the elongated member is advanced. In many instances, the elongated member is loaded broadwise onto the conveyor and thus moves endwise of the rollers during the loading.

The invention more particularly relates to a roller conveyor for advancing an elongated structural member having an asymmetrical cross-sectional shape. For example, many beams or rails include a web whose ends are formed with depending flanges of different lengths. Still other structural members, such as a T-beams, include a web with a depending flange at one end and with no flange at the other end. As a result of the dissimilar ends, such asymmetrical members normally assume a cocked or canted position when loaded onto the conveyor rollers and do not naturally lie with their webs and flanges disposed in the square position needed to effect punching with standard structural presses.

SUMMARY OF THE INVENTION

The general aim of the present invention is to provide a new and improved roller conveyor which is capable of squaring the asymmetrical member after the latter has been loaded broadwise onto the conveyor rollers.

A more detailed object is to provide a roller conveyor in which certain ones of the rollers may be moved vertically relative to other ones of the rollers to rock the structural member from its normally canted position to a square position facilitating the performance of a punching operation or other operation on the member.

A further object of the invention is to provide mechanism for shifting a group of vertically movable rollers in unison to enable quick and easy squaring of the member, the mechanism being capable of shifting the roller group through different selected distances to enable the squaring of different types and sizes of members.

Still another object is to provide a conveyor with vertically movable rollers which do not interfere with broadwise loading of the structural member and which always share in sustaining the weight of the member.

An additional object is to provide a unique arrangement for power-rotating the vertically movable rollers so that these rollers may coact with the other rollers in advancing the structural member.

These and other objects and advantages of the invention will become more apparent from the following detailed description when taken in conjunction with the accompanying drawings.

BRIEF DESCRIPTION OF THE DRAWINGS

FIG. 1 is a perspective view of an exemplary punching line with which the roller conveyor of the present invention is particularly adapted for use.

FIG. 2 is a perspective view of one section of a new and improved roller conveyor embodying the novel features of the present invention.

FIG. 3 is a top plan view of the conveyor shown in FIG. 2, FIG. 3 being on a reduced scale.

FIG. 4 is an enlarged fragmentary elevation of parts shown in FIG. 3, the view being taken along the line 4—4 of FIG. 3.

FIG. 5 is a front elevation of the conveyor shown in FIG. 3.

FIG. 6 is an enlarged fragmentary cross-section taken substantially along the line 6—6 of FIG. 5.

FIG. 7 is a view similar to FIG. 6 but showing parts in moved positions.

FIGS. 8 and 9 are cross-sectional views of exemplary structural members adapted to be advanced on the conveyor.

DETAILED DESCRIPTION OF THE PREFERRED EMBODIMENT

The invention is shown in the drawings in conjunction with a material handling system in which an elongated structural member such as a rail 10 is advanced broadwise from a transfer conveyor 11 to a set of roller conveyors 13a to 13f and then is advanced endwise or lengthwise on the roller conveyors to an operating station where a job is performed on the rail. By way of example, a punch press 14 is shown as located in the operating station and serves to punch holes in the rail at spaced locations therealong. An exemplary press is disclosed in detail in U.S. Pat. No. 3,392,593.

The transfer conveyor 11 is of conventional construction and includes a series of side-by-side skids 15 (FIG. 1) upon which the rail 10 rests, the rail being propelled broadwise along the skids by power-driven chains (not shown) associated with the skids. Three roller conveyors 13a, 13b and 13c are located between the downstream ends of the skids, and the other three roller conveyors 13d, 13e and 13f lead to the punch press 14. The roller conveyor section 13b shown in FIG. 2 is exemplary of the roller conveyors and includes several horizontally spaced rollers 16 and 17 which extend horizontally between and are journaled by a pair of laterally spaced supports or frame members 19 and 20 mounted on suitable legs 21. A back gage 23 is fixed to the rear frame member 20 and engages the rail 10 to hold the latter in the proper lateral position for advancement to the punch press, such position being the normal conveying position and being shown in FIG. 7.

In this particular instance, the rail 10 is of the type used for supporting an overhead trolley or crane and includes a flat web 24 (FIG. 8) whose ends are formed with flanges 25 and 26 which depend from the web by unequal distances. Because the flanges are unequal in length, the rail normally assumes a cocked position (see FIG. 6), and, in this position, the web 24 is inclined relative to a horizontal plane and the flange 25 is inclined relative to a vertical plane. The punches of the press 14 reciprocate vertically to punch the web 24 and horizontally to punch the flange 25 and thus the cocked position of the rail is not compatible with the press.

According to the present invention, the roller conveyor 13 is uniquely constructed to rock the rail 10 from its normally cocked position to a squared position as shown in FIG. 7 so as to locate the web 24 and the flange 25 in horizontal and vertical planes, respectively, for advancement to the punch press 14. Such rocking is accomplished in a novel manner by supporting the flanges 25 and 26 on the rollers 16 and 17, respectively, and by moving the rollers 17 vertically relative to the rollers 16 after loading of the rail thereby to raise the flange 26 with respect to the flange 25 and thus square the rail.

More specifically, the rollers 16 are standard cylindrical rollers having a uniform diameter throughout their length and having end trunnions 30 (FIG. 2) by which the rollers are journaled in the frame members 19 and 20. The rollers 16 are held in vertically fixed positions and their upper surfaces are all located in a single horizontal plane.

For convenience, the rollers 17 may be called elevating rollers and each includes end trunnions 31 (FIG. 7) by which the roller is journaled for rotation. The conveyor 13b shown in FIGS. 2 and 3 includes six standard rollers 16 and two elevating rollers 17, each elevating roller being disposed between two standard rollers. The elevating rollers are shorter in length than the standard rollers and are positioned such that their rear ends are located short of and spaced forwardly from the back gage 23.

In order to move the elevating rollers 17 vertically, two arms 33 (FIGS. 2 and 7) are connected to the end trunnions 31 of the elevating rollers. The opposite ends of each pair of arms are fastened rigidly to a horizontal rock shaft 34 which extends between and is journaled in the frame members 19 and 20 to turn about a horizontal axis. As the shafts are turned clockwise (FIG. 5), the elevating rollers 17 are swung upwardly from their lowered positions shown in full lines to their raised positions shown in phantom, the upper surfaces of the elevating rollers being spaced well above the upper surfaces of the standard rollers 16 when the elevating rollers are in their raised positions. When the elevating rollers are in their lowered positions, their upper surfaces are disposed in the same horizontal plane as the upper surfaces of the standard rollers and are located just above the top edge of the front frame member 19.

With the foregoing arrangement, the rail 10 is loaded onto the roller conveyors 13a, 13b and 13c by the transfer conveyor 11 while the elevating rollers 17 are in their lowered positions. With the elevating rollers thus positioned, the rail may be moved broadwise across the front frame member 19 and then loaded onto the rollers 16 and 17 while being moved endwise of the latter. The skids 15 are located just below the upper surfaces of the rollers and thus the weight of the rail is picked up by the rollers as the rail is moved onto the rollers. The chains of the transfer conveyor 11 advance the rail along the rollers until the flange 25 engages and stops against the back gage 23.

When stopped against the back gage 23, the rail 10 is cocked as shown in FIG. 6 and is located with its short flange 26 supported by all of the rollers 16 and 17 and with its long flange 25 supported by the standard rollers 16. To square up the rail, the elevating rollers 17 are swung upwardly to their raised positions and, during such swinging, lift the short flange 26 upwardly off of the standard rollers 16 as shown in FIG. 7. Being positioned beyond the rear ends of the elevating rollers 17, the long flange is free of contact with such rollers and simply rocks on the standard rollers as the short flange is lifted. Such lifting is continued until the web 24 is moved into a horizontal plane and the flanges 25 and 26 are disposed vertically (see FIG. 7). The rail thus is squared up and may be advanced to the press 14 for punching of the web 24 and the flange 25.

Selectively operable power means are provided for moving the elevating rollers 17 between their raised and lowered positions. Herein, these means comprise a reversible rotary motor 40 (FIG. 2) which acts through a right angle gear box 41 to drive a pair of chains 43 and 44. The chain 43 is connected to a sprocket 45 on one of the shafts 34 while the chain 44 drives another chain 46 which is connected to a sprocket 47 on the other shaft 34. When the motor is energized by "up" or "down" buttons on a control box 49 (FIG. 2), the shafts 34 are turned through limited distances to raise or lower the elevating rollers 17 in unison.

Advantageously, the height to which the rollers 17 are elevated may be selectively adjusted so that the rollers may be raised to different elevations when the system is used to convey rails having a smaller or larger differential between the length of the two flanges. For this purpose, a disc 50 (FIG. 4) is keyed to the outboard end of one of the shafts 34 and carries a radially projecting dog 51. When the elevating rollers have reached a predetermined elevation, the dog engages the actuator of a limit switch 53 which automatically de-energizes the motor 40. The dog 51 is adjustable angularly on the disc and may be anchored in various angular positions by a set screw 54 (FIG. 4). By adjusting the position of the dog, the elevating rollers 17 may be stopped automatically upon reaching different elevations determined by the differential between the flanges 25 and 26. Preferably, the disc 50 is calibrated as shown in FIG. 4 to facilitate placement of the dog in the desired position.

Downward swinging of the elevating rollers 17 is also stopped automatically when the rollers reach their lowered positions. Such stopping is effected by a dog 55 (FIG. 5) carried on the chain 43 and engageable with the actuator of a second limit switch 56 operable to de-energize the motor 40, the dog engaging the switch actuator when the elevating rollers reach their lowered positions.

In accordance with another aspect of the invention, both the standard rollers 16 and the elevating rollers 17 are power-rotated so that both types of rollers positively advance the rail 10 to the press 14. To rotate the standard rollers, a motor 60 (FIG. 2) is connected by a chain 61 to a sprocket 63 (FIG. 5) on the rear trunnion 30 of one of the end rollers 16. Another chain 64 is connected to a second sprocket (not shown) on the trunnion 30 and is trained over sprockets 65 fast on the trunnions of the other standard rollers. Thus, all of the standard rollers are rotated when the motor 60 is energized.

Rotation of the elevating rollers 17 is effected in a unique manner by transferring the rotation of the standard rollers 16 to the shafts 34 and then by transferring the rotation from the shafts to the elevating rollers. For this purpose, a small sprocket 70 (FIG. 2) is fastened intermediate the ends of each of the two standard rollers 16 which are located adjacent the shafts 34. A chain 71 is connected between each sprocket 70 and a drive element in the form of another sprocket 73 (see FIG. 7). The latter is fast on a hub 74 which is freely rotatable on the shaft. Still another drive element or sprocket 75 is fast on the hub and is connected by a chain 76 to a small sprocket 77 located intermediate the ends of the elevating roller 17.

Accordingly, rotation of the standard rollers 16 effects rotation of the hubs 74 which, in turn, rotate the elevating rollers 17 so that the latter assist the standard rollers in advancing the rail 10. Because the drive to the elevating rollers is coaxial with the shafts 34, the drive can be maintained regardless of whether the elevating rollers are in their raised or lowered positions.

From the foregoing, it will be apparent that the present invention brings to the art a new and improved roller conveyor 13 which is capable of squaring up an asymmetrical structural member so that the member can be advanced in the proper position for the performance of a punching operation or the like. While the rail 10 which has been described specifically in conjunction with the conveyor includes depending flanges 25 and 26 of unequal length, those familiar with the art will appreciate that the conveyor may be used to advantage in conjunction with other asymmetrical shapes which normally assume a cocked position. For example, the conveyor may be used with a T-shaped rail 10' of the type shown in FIG. 9. Such a rail includes a web 24' with a depending flange 25' at one edge and with no depending flange at its other edge. A rail of this type is disposed in a cocked position when initially loaded and may be squared up by raising the elevating rollers 17 so as to lift the flangeless edge of the web 24'.

Also, it should be realized that the elevating rollers 17 may take different forms and may be mounted in different manners than specifically described above. By way of example, the elevating rollers may be made the same length as the standard rollers 16 and may be formed with rear end portions of reduced diameter in order to provide clearance for the long flange 25 when the rail 10 is rocked. The ends of such rollers may be adjustably mounted in the frame members 19 and 20 rather than being carried on the arms 33. Still another way of squaring up the rail is to leave the rollers with shortened or reduced diameter ends in stationary positions and to lower the standard length rollers after initial loading of the rail.

I claim as my invention:

1. A roller conveyor for transporting in a lengthwise direction an elongated structural member having a web with a first depending flange at one of its side edges and with either a shorter depending flange or no depending flange at its opposite side edge, said conveyor comprising a pair of laterally spaced supports, a series of generally horizontally extending and horizontally spaced standard rollers extending between and journaled by said supports for rotation about generally horizontal axes, power means for rotating said standard rollers about their own axes, a series of generally horizontally extending and horizontally spaced elevating rollers extending parallel to said standard rollers, one of said standard rollers being located next to one of said elevating rollers and another of said standard rollers being located next to another of said elevating rollers, arms supporting said elevating rollers for rotation about generally horizontal axes, means mounting said arms on said supports for up and down swinging to enable movement of said elevating rollers between lowered and raised positions, said last-mentioned means comprising generally horizontal shafts extending between said supports and journaled for rotation about horizontal axes, said arms being secured to said shafts to swing upwardly when said shafts are turned in one direction and to swing downwardly when said shafts are turned in the opposite direction, a selectively energizable reversible motor for rotating said shafts to swing said arms upwardly and downwardly, drive elements coaxial with and rotatable relative to said shafts, means rotatably connecting said standard rollers with said drive elements and rotatably connecting said drive elements to said elevating rollers whereby the latter are rotated in response to rotation of said standard rollers, said standard rollers having upper surfaces for supporting said first depending flange of said member and all disposed in substantially the same horizontal plane, said elevating rollers each having an upper surface which supports the opposite side edge of said web and which terminates short of said first flange when said member is in a conveying position on said conveyor, the upper surfaces of said elevating rollers being located no higher than the upper surface of said standard rollers when said elevating rollers are in said lowered positions thereby to enable said member to be moved endwise of the rollers and loaded onto the latter, and the upper surfaces of said elevating rollers being located above the upper surfaces of the standard rollers when the elevating rollers are in said raised positions thereby to enable raising of said opposite side edge of said web to effect a change in the angular orientation of the loaded member.

2. A roller conveyor as defined in claim 1 further including means for automatically de-energizing said motor when said elevating rollers reach a predetermined elevation, said last-mentioned means being selectively adjustable to enable selective changing of said predetermined elevation.

* * * * *